(12) United States Patent
Zhou (10) Patent No.: US 11,770,468 B1
(45) Date of Patent: Sep. 26, 2023

(54) APPARATUS FOR STICKING FILM ON DISPLAY SCREEN

(71) Applicant: Guangzhou SunRuo Film Co., Ltd, Guangzhou (CN)

(72) Inventor: Rubiao Zhou, Guangzhou (CN)

(73) Assignee: Guangzhou SunRuo Film Co., Ltd, Guangzhou (CN)

( * ) Notice: Subject to any disclaimer, the term of this patent is extended or adjusted under 35 U.S.C. 154(b) by 0 days.

(21) Appl. No.: 18/297,647

(22) Filed: Apr. 10, 2023

(30) Foreign Application Priority Data

Mar. 9, 2023 (CN) .......................... 202320450234.0

(51) Int. Cl.
*G02F 1/1333* (2006.01)
*H04M 1/02* (2006.01)

(52) U.S. Cl.
CPC ..... *H04M 1/0266* (2013.01); *G02F 1/133311* (2021.01); *G02F 1/133331* (2021.01)

(58) Field of Classification Search
CPC ............ G02F 1/1333; G02F 1/133311; G02F 1/133331; G02F 1/1335; G02F 1/133519; H04M 1/0266
See application file for complete search history.

(56) References Cited

U.S. PATENT DOCUMENTS

| | | | |
|---|---|---|---|
| 9,799,264 B2 | 10/2017 | Eom et al. | |
| 11,181,992 B2 | 11/2021 | Chandrasekhara | |
| 11,217,195 B2 | 1/2022 | Wang | |
| 2022/0111625 A1* | 4/2022 | Patel | B32B 37/0053 |
| 2022/0388233 A1* | 12/2022 | MacDonald | B32B 37/12 |

* cited by examiner

*Primary Examiner* — Thoi V Duong
(74) *Attorney, Agent, or Firm* — True Shepherd LLC; Andrew C. Cheng (57) ABSTRACT

An apparatus for sticking a film on a display screen includes a fixing assembly including a device fixing base and a film fixing base connected to and rotatable relative to the device fixing base; a film holder; and a roll assembly including a press roll. When the film holder is brought to the position facing the device fixing groove, the first end of the film holder is closer to the display screen than the second end; the film holder has a first surface facing the display screen and a second surface opposite to the first surface and facing the film fixing base; and the first surface is adhered with a protective film capable of being attached to the display screen of the electronic device. The press roll is configured to roll on the second surface of the film holder to apply a force on the protective film.

13 Claims, 8 Drawing Sheets

APPARATUS FOR STICKING FILM ON DISPLAY SCREEN

CROSS-REFERENCE TO RELATED APPLICATIONS

This application claims priority to Chinese Patent Application No. 202320450234.0 with a filing date of Mar. 9, 2023. The content of the aforementioned application, including any intervening amendments thereto, is incorporated herein by reference.

TECHNICAL FIELD

The present disclosure relates to the field of sticking film on a display screen, in particular to an apparatus for sticking a film on a display screen of an electronic device.

BACKGROUND

For an electronic device equipped with a touch screen, a protective film is usually attached to a surface of the touch screen, which reduces scratch and damage to the touch screen in daily use. In order not to affect the function of the touch screen, the protective film is usually a thin transparent film, which can better transmit a press force of a user to the touch screen.

The protective film is generally adapted to the touch screen in size. Therefore, whether the protective film is attached in place greatly affects an appearance and user experience of the device. At present, the protective film is usually stuck manually. An operator gently grips both sides of the protective film by a thumb and a forefinger, aligns the protective film with the touch screen, and presses the protective film on the surface of the touch screen. Finally, the operator uses a scraper or a press roll to squeeze out air between the protective film and the touch screen, which reduces bubbles generated between the protective film and the touch screen.

However, the protective film is completely manually positioned, which imposes a high requirement for the operator. The film is often misaligned with the touch screen, which affects aesthetics. The positioning process is time-consuming, and therefore the efficiency for sticking the film is low. In addition, it is found that a common method for sticking the film is that the user grips both ends of the protective film and make a middle part of the protective film to be concaved downwards. The middle part of the protective film is first attached to the touch screen, and then squeezed from the middle part to two ends for exhausting. According to this method, boundaries are easily generated in the middle part of the protective film, and accumulated bubbles are difficult to squeeze out. Therefore, film sticking effect is poor.

SUMMARY OF THE INVENTION

An objective of the present disclosure is to provide an apparatus for sticking a film on a display screen of an electronic device, which is capable of resolving at least one of the technical problems existing in the prior art to improve film sticking efficiency and to obtain better film sticking effect.

To resolve the foregoing technical problems, the following technical solutions are adopted.

An apparatus for sticking a film on a display screen of an electronic device includes:

a fixing assembly comprising a device fixing base and a film fixing base, wherein a device fixing groove is defined in the device fixing base for accommodating the electronic device, the film fixing base is connected to the device fixing base and rotatable relative to the device fixing base to a position facing the device fixing groove, and a first fixing column and a second fixing column are defined on two ends of the film fixing base are respectively;

a film holder, wherein a first end of the film holder is connected with the first fixing column, and a second end of the film holder is connected with the second fixing column so that the film holder is brought to the position facing the device fixing groove when the film fixing base is rotated toward the device fixing base; the first and second end of the film holder are connected to the first and second fixing columns respectively in a way that when the film holder is brought to the position facing the device fixing groove, the first end of the film holder is closer to the display screen of the electronic device than the second end; the film holder has a first surface facing the display screen and a second surface opposite to the first surface and facing the film fixing base; and the first surface is adhered with a protective film capable of being attached to the display screen of the electronic device; and a roll assembly comprising a press roll, wherein the press roll is configured to roll on the second surface of the film holder to apply a force toward the electronic device on the protective film, and the press roll is configured to roll from the first end to the second end of the film holder.

Preferably, a notch is defined on an edge of the device fixing groove that allows a user to draw out the electronic device from the device fixing groove.

Preferably, both the first fixing column and the second fixing column are detachably connected with the film holder.

Preferably, the press roll is a flexible roll.

Preferably, two ends of the press roll each are provided with a chamfer capable of fitting a side edge of the device.

Preferably, the device fixing base further comprises a roll supporter for supporting the press roll when the press roll is not in work.

Preferably, the apparatus for sticking the film on the display screen further includes a sealing cover. The sealing cover is movably connected with the fixing assembly and configured to cover the fixing assembly.

Preferably, an ultraviolet emission device is arranged in the sealing cover.

Preferably, the device fixing base comprises a first sliding groove, and the sealing cover comprises a first sliding block capable of sliding in the first sliding groove, so that the sealing cover is connected with the device fixing base in a sliding manner. The press roll is rotationally connected to a bottom of the sealing cover, so that the press roll is driven to roll on the film holder when the sealing cover slides.

Preferably, a first engaging portion is defined in the first sliding groove. The first engaging portion extends inwards into the first sliding groove, to be in contact with the first sliding block and apply a resistance against sliding of the first sliding block.

Preferably, the sealing cover is connected to the device fixing base and rotatable relative to the device fixing base, the film fixing base comprises a second sliding groove, the roll assembly further comprises a second sliding block capable of sliding in the second sliding groove, and the press roll is rotationally connected with the second sliding block, so that the second sliding block drives the press roll to roll on the film holder.

Preferably, the first sliding groove comprises a second engaging portion. The second engaging portion extends inwards into the second sliding groove, to be in contact with the second sliding block and apply a resistance against sliding of the second sliding block.

Preferably, the roll assembly further includes a handle. The handle is engaged with the second sliding block and configured to be gripped by a user to push the second sliding block.

Preferably, two adjacent edges of the protective film are respectively a first reference edge and a second reference edge. The display screen of the electronic device has a third reference edge corresponding to the first reference edge and a fourth reference edge corresponding to the second reference edge. After the protective film is attached to the display screen of the electronic device, a distance between the first reference edge and the third reference edge and a distance between the second reference edge and the fourth reference edge each are less than 3 mm.

The present disclosure at least has the following beneficial effects: According to present disclosure, the device fixing base and the film fixing base are used to fix the electronic device and the protective film respectively, and the electronic device and the protective film can hence be aligned automatically without relying on visual alignment. Accordingly, the accuracy and efficiency of alignment of the protective film are improved. The press roll rolls from one end to the other end of the protective film, so that it can avoid from generating boundaries and bubbles during the film sticking process, and the final film sticking effect is improved.

BRIEF DESCRIPTION OF THE DRAWINGS

To describe the technical solutions of the present disclosure more clearly, the drawings are briefly described below. Apparently, the embodiments showing in the drawing are merely a part rather than all of the embodiments of the present disclosure. Those skilled in the art can obtain other solutions and drawings based on these drawings without creative efforts.

FIG. 3 shows a sealing cover of the apparatus according to the embodiment 1 of the present disclosure, wherein (a) is a bottom view and (b) is a side view;

FIG. 4 is shows a film fixing base of the apparatus according to the embodiment 1 of the present disclosure, wherein (a) is a bottom view and (b) is a side view;

FIG. 8 is a schematic diagram showing working processes of the apparatus according to the present disclosure, wherein (a) shows a press roll rolling from one end to the other end of a film holder; (b) shows a protective film is attached to the display screen; and (c) shows that the film holder is separated from the film fixing base and attached to the display screen.

Reference numerals: 100—fixing assembly, 110—device fixing base, 111—device fixing groove, 1111—notch, 112—first sliding groove, 1121—first engaging portion, 113—roll supporter, 114—buckle, 120—film fixing base, 121—first fixing column, 122—second fixing column, 123—second sliding groove, 1231—second engaging portion, 124—step, 200—film holder, 210—first end, 220—second end, 230—first surface, 240—second surface, 300—roll assembly, 310—press roll, 320—second sliding block, 330—handle, 400—sealing cover, 410—first sliding block, 500—ultraviolet emission device, 600—device, 610—third reference edge, 620—fourth reference edge, 700—protective film, 710—first reference edge, 720—second reference edge, and 800—roller.

DETAILED DESCRIPTION OF THE EMBODIMENTS

Specific embodiments of the present disclosure will be described in detail below. Preferred embodiments of the present disclosure are illustrated in the drawings. The drawings serve as supplement to the text description herein, providing a visual understanding of each technical feature and the overall technical solution of the present disclosure, but cannot be construed as a limitation to the protection scope of the present disclosure.

In the description of the present disclosure, it should be understood that orientations or position relationships indicated by terms "upper", "lower", "front", "rear", "left", and "right" refer to orientation or position relationships as shown in the drawings, and these terms are just used to facilitate description of the present disclosure and simplify the description, but not to indicate or imply that the mentioned device or component must have a specific orientation and must be established and operated in a specific orientation, and thus cannot be construed as a limitation to the present disclosure.

In the description of the present disclosure, "several" means a number larger than one, while "a plurality of" means a number larger than two; and "greater than", "less than", "over" and the like are construed as not including the number, and "above", "below", "within", and the like are construed as including the number. The "first" and "second" in the description are only intended to distinguish technical features, rather than to indicate or imply relative importance or implicitly indicate a number of the indicated technical features or implicitly indicate a sequence relationship of the indicated technical features.

In the description of the present disclosure, unless otherwise explicitly defined, the words such as "arrange", "install" and "connect" should be understood in a broad sense, and those skilled in the technical field can reasonably determine the specific meanings of the above words in the present disclosure in combination with specific contents of the technical solutions.

The present disclosure provides an apparatus for sticking a film on a display screen of an electronic device. The apparatus includes a fixing assembly 100, an film holder 200, and a roll assembly 300. The fixing assembly 100 includes a device fixing base 110 and a film fixing base 120. The device fixing base 110 and the film fixing base 120 are connected to each other in a rotatable manner. The device fixing base 110 is configured to fixing an electronic device 600, and the film fixing base 120 is configured to fix a protective film 700. When the film fixing base 120 is rotated toward the device fixing base 110, the protective film 700 may just cover and align with the display screen of the electronic device 600, without relying on manual visual alignment, so that accuracy of the alignment and efficiency of film sticking are improved. In addition, a press roll 310 in the roll assembly 300 may roll from one end to the other end of the film holder 200, to squeeze out bubbles between the protective film 700 and the display screen of the electronic device 600 in a rolling process. This rolling process reduces or even avoids bubbles or boundaries generated in a film sticking process, so that the film sticking effect is better than that by adopting a traditional film sticking method.

Figure 1:
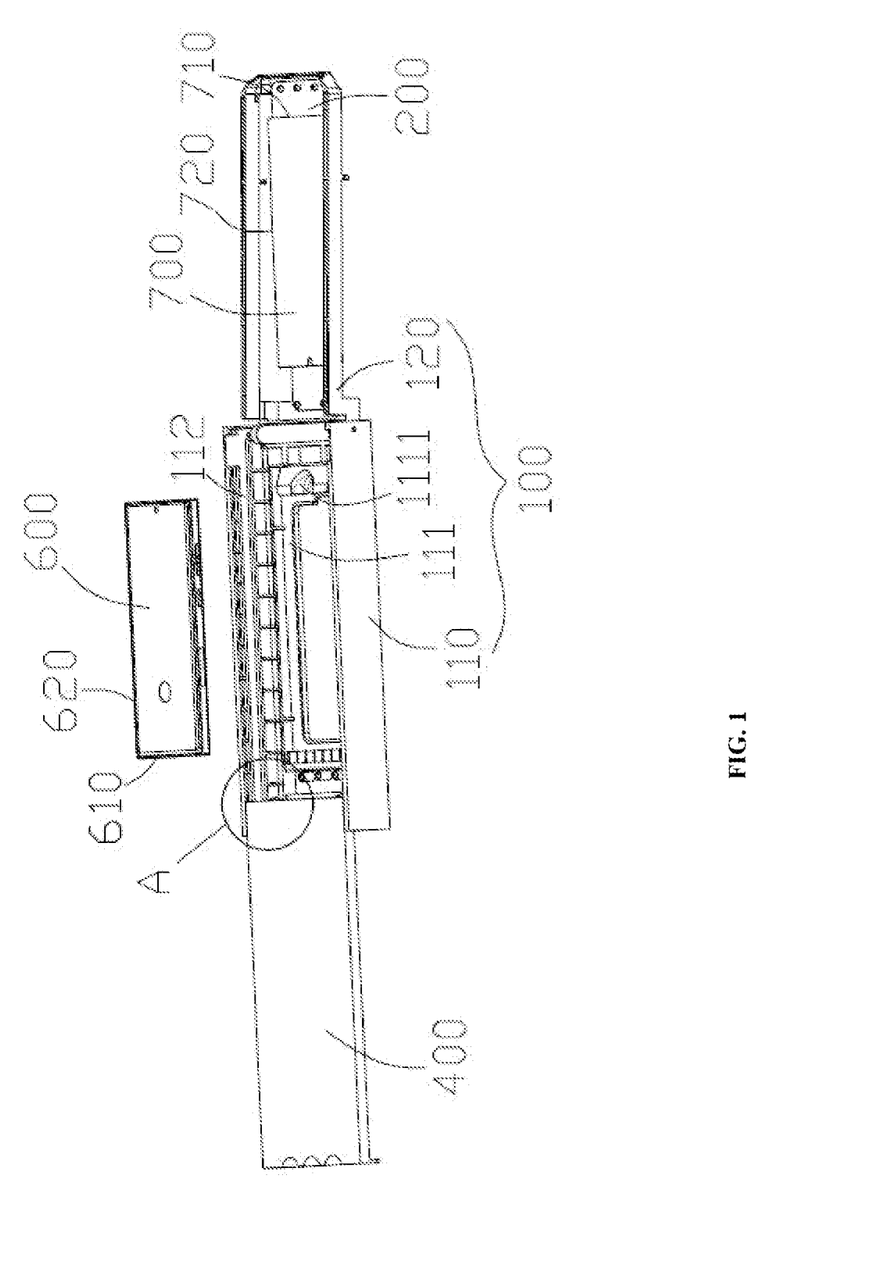
FIG. 1 is a three-dimensional diagram showing an apparatus for sticking a film on a display screen according to an embodiment 1 of the present disclosure.
Figure 5:
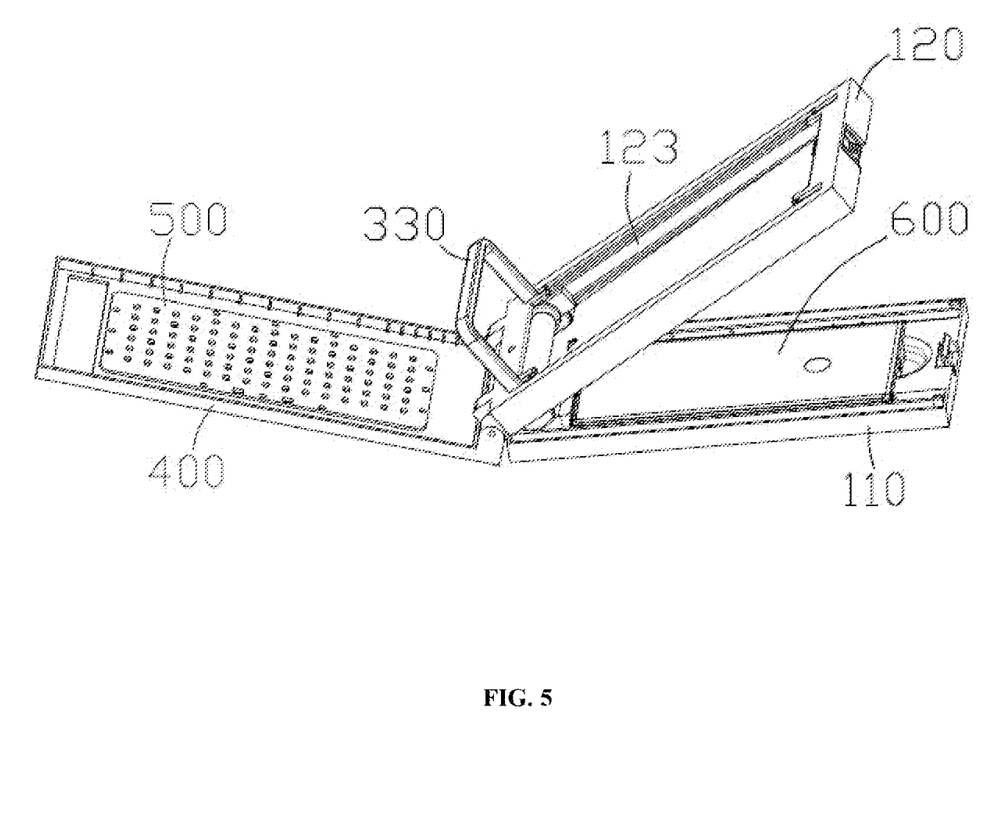
FIG. 5 is a three-dimensional diagram showing an apparatus for sticking a film on a display screen according to an embodiment 2 of the present disclosure.

Referring to FIG. 1 and FIG. 5, the apparatus includes the fixing assembly 100, the film holder 200, the roll assembly 300, and a sealing cover 400. The fixing assembly 100 is a main structure of the apparatus and includes the device fixing base 110 and the film fixing base 120. The device fixing base 110 has a device fixing groove 111 for accommodating the electronic device 600. The device fixing groove 111 is adapted to an outline of the electronic device 600, and may be replaced according to a type of the electronic device 600, to improve universality of the present disclosure. It should be noted that, the electronic device may be, for example a mobile phone, a tablet computer, or other touch screen devices. An edge of the device fixing groove 111 comprises a notch 1111 that allows a user to prick a finger to the notch 1111 and draw out the device 600 from the device fixing groove 111.

Figure 4:
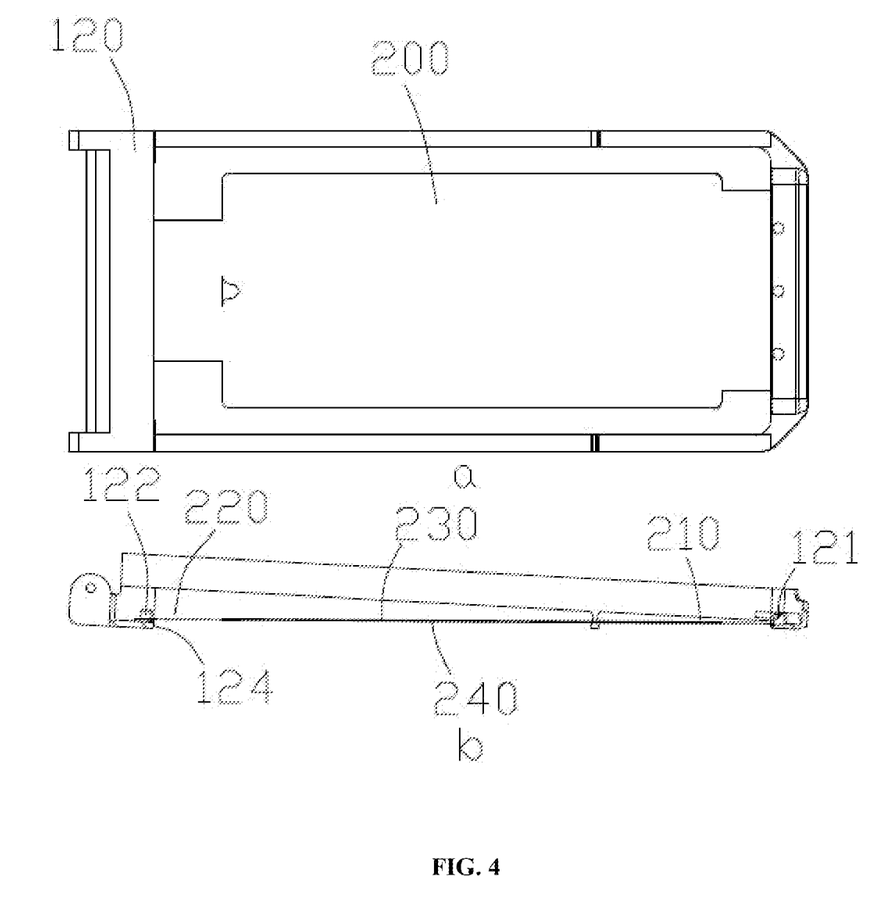

Referring to FIG. 4, the film fixing base 120 is connected to the device fixing base 110 and may be rotated relative to the device fixing base to a position just above the device fixing groove 111. A first fixing column 121 and a second fixing column 122 are respectively defined on two ends of the film fixing base 120, and configured to fix the film holder 200. Specifically, the film fixing base 120 is provided with a step 124. The user may flip out the film fixing base 120 using the step 124 as a point of application of a force.

A first end 210 of the film holder 200 is connected with the first fixing column 121, and a second end 220 the film holder 200 is connected with the second fixing column 122. Specifically, both the first fixing column 121 and the second fixing column 122 are detachably connected with the film holder 200, so that when the roll assembly 300 subsequently rolls the film holder 200, the film holder 200 may be separated from the film fixing base 120 and attached to the display screen of the electronic device 600. After the film holder 200 is fixed on the film fixing base 120, the film fixing base 120 carries film holder 200 to rotate to a position facing the device fixing groove 111. It should be noted that, heights of the first fixing column 121 and the second fixing column 122 are different, so that the first end 210 of the fixed film holder 200 is closer to the display screen of the electronic device 600 than the second end 220. An included angle between the whole film holder 200 and the electronic device 600 is an acute angle, which facilitates subsequent rolling of the roll assembly 300. The film holder 200 has a first surface 230 facing the display screen and a second surface 240 opposite to the first surface 230 and facing the film fixing base 120. The first surface 230 is adhered with a protective film 700 and capable of being attached to the display screen of the electronic device 600. In the alignment of the protective film 700, two adjacent edges of the protective film 700 are respectively a first reference edge 710 and a second reference edge 720. The display screen of the electronic device 600 has a third reference edge 610 corresponding to the first reference edge 710 and a fourth reference edge 620 corresponding to the second reference edge 720. After the protective film 700 is attached to the display screen of the device 600, a distance between the first reference edge 710 and the third reference edge 610 and a distance between the second reference edge 720 and the fourth reference edge 620 each are less than 3 mm. Therefore, the protective film 700 may adapt to the display screen of the electronic device 600 as much as possible, so that the film sticking effect is better.

The roll assembly 300 is configured to roll on the film holder 200, so that the protective film 700 supported by the film holder 200 may be better attached to the display screen of the electronic device 600. The roll assembly 300 includes the press roll 310, and rolls on the second surface 240 of the film holder 200 to apply a force toward the electronic device 600 on the film holder 200. It should be noted that, the press roll 310 rolls from the first end 210 of the film holder 200 to the second end 220 starting from the first end 210 closer to the electronic device 600, so that the protective film 700 may be smoothly attached to the surface of the device 600. The press roll 310 is specifically a roller-like structure made of a flexible material. This can increase a friction between the press roll 310 and the protective film 700. Due to the elasticity of the press roll, bubbles between the protective film 700 and the device 600 may be effectively eliminated. An outline of the press roll 310 is adapted to the display screen of the device 600. For a device having a flat screen, the press roll 310 is in a cylindrical. For a device having a curved screen, two ends of the press roll each 310 are provided with a chamfer capable of fitting a side edge of the device 600. This not only reduces the a lateral offset that may occur in a rolling process of the press roll 310, but also sticks the film on curved surfaces on both sides of the device having a curved screen.

In one embodiment, the device fixing base 110 comprises a roll supporter 113, for supporting the press roll 310 when the press roll is not in work. An upper surface of the roll supporter 113 is not lower than an upper surface of the electronic device 600, so that the press roll 310 may smoothly roll from the roll supporter 113 to the display screen of the electronic device 600. In addition, the upper surface of the roll supporter 113 is provided with a bump. The bump may be in contact with the press roll 310 and an upward supporting force is applied, so that the press roll 310 directly acts on a top surface of the device 600 after rolling.

The sealing cover 400 is movably connected with the fixing assembly 100 and is configured to cover the fixing assembly 100, to protect against dust in daily days. In addition, an ultraviolet emission device 500 is arranged in the sealing cover 400, and may be electrically connected with an external power supply through a charging interface, to perform ultraviolet radiation for the protective film 700 after the roll assembly 300 rolls on the protective film 700, and then complete UV film sticking work. This improves the universality of the present disclosure.

Regarding the connection between the roll assembly 300 and the sealing cover 400, the present disclosure provides two preferred embodiments, but it is easily understood that the technical solutions of the present disclosure are not limited to the two embodiments.

Embodiment 1

Figure 2:
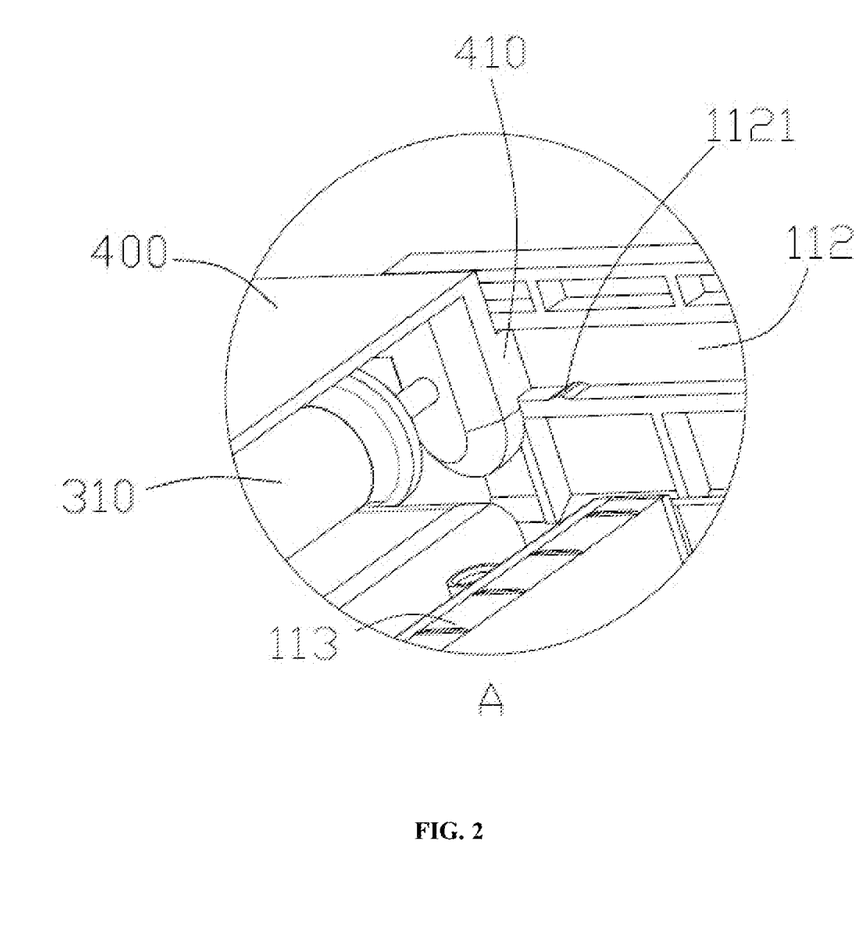
FIG. 2 is a partially enlarged view of FIG. 1.
Figure 3:
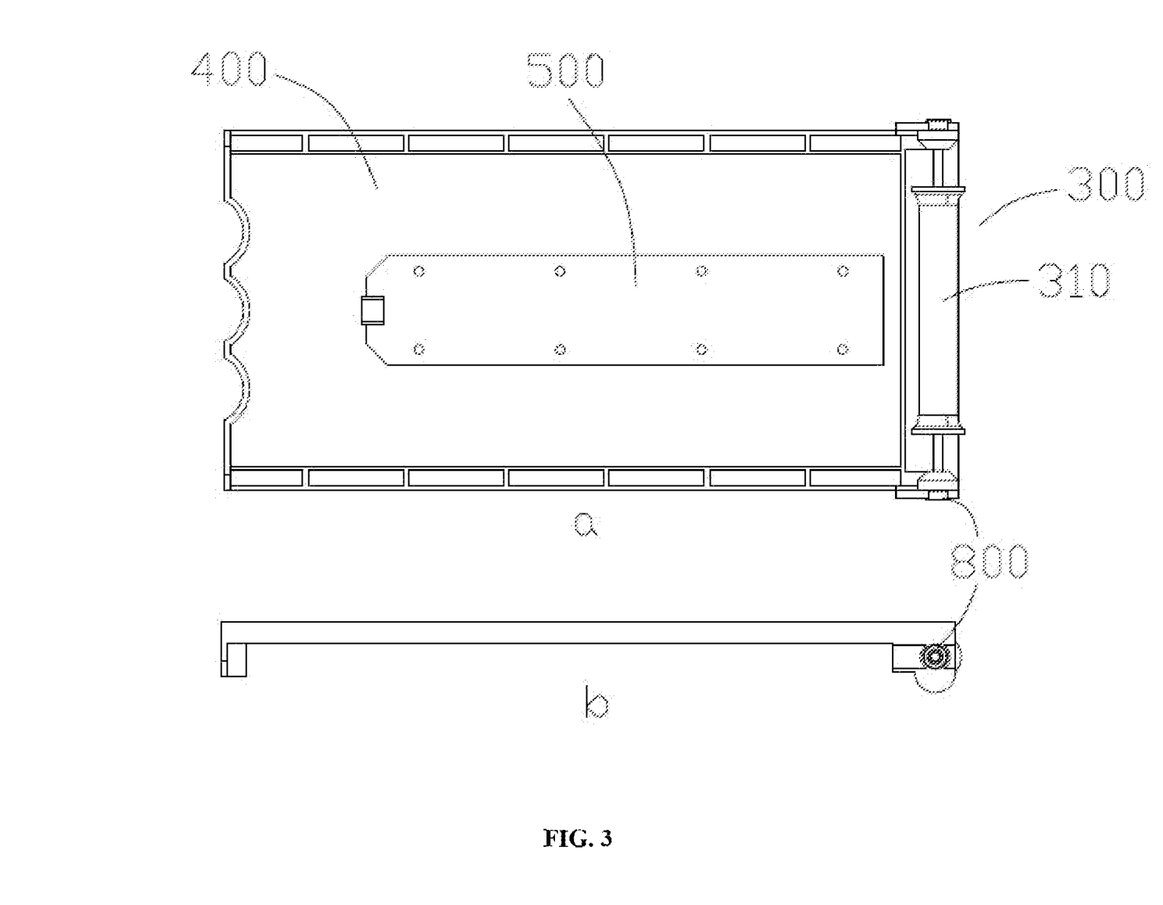

Referring to FIG. 1 to FIG. 2, the device fixing base 110 is provided with a first sliding groove 112, and the sealing cover 400 is provided with a first sliding block 410 capable of sliding in the first sliding groove 112, so that the sealing cover 400 may be connected with the device fixing base 110 in a sliding manner. Referring to FIG. 3, the press roll 310 is rotationally connected to a bottom of the sealing cover 400, so that the sealing cover 400 drives the press roll 310 to roll while the sealing cover 400 slides. After the rolling is completed the sealing cover 400 is closed, the ultraviolet emission device 500 may irradiate.

Specifically, a roller 800 is arranged in first sliding block 410, so that a sliding connection between the first sliding block 410 and the first sliding groove 112 is converted into a rolling connection, to reduce a friction resistance between thereof.

A first engaging portion 1121 is defined in the first sliding groove 112. The first engaging portion extends inwards into the first sliding groove 112, to be in contact with the first sliding groove 112 and apply a resistance against sliding of the first sliding groove 112, so that the user can sense a specific position of the first sliding groove 112 through sense of touch, to limit the first sliding block 410.

Embodiment 2

Figure 6:
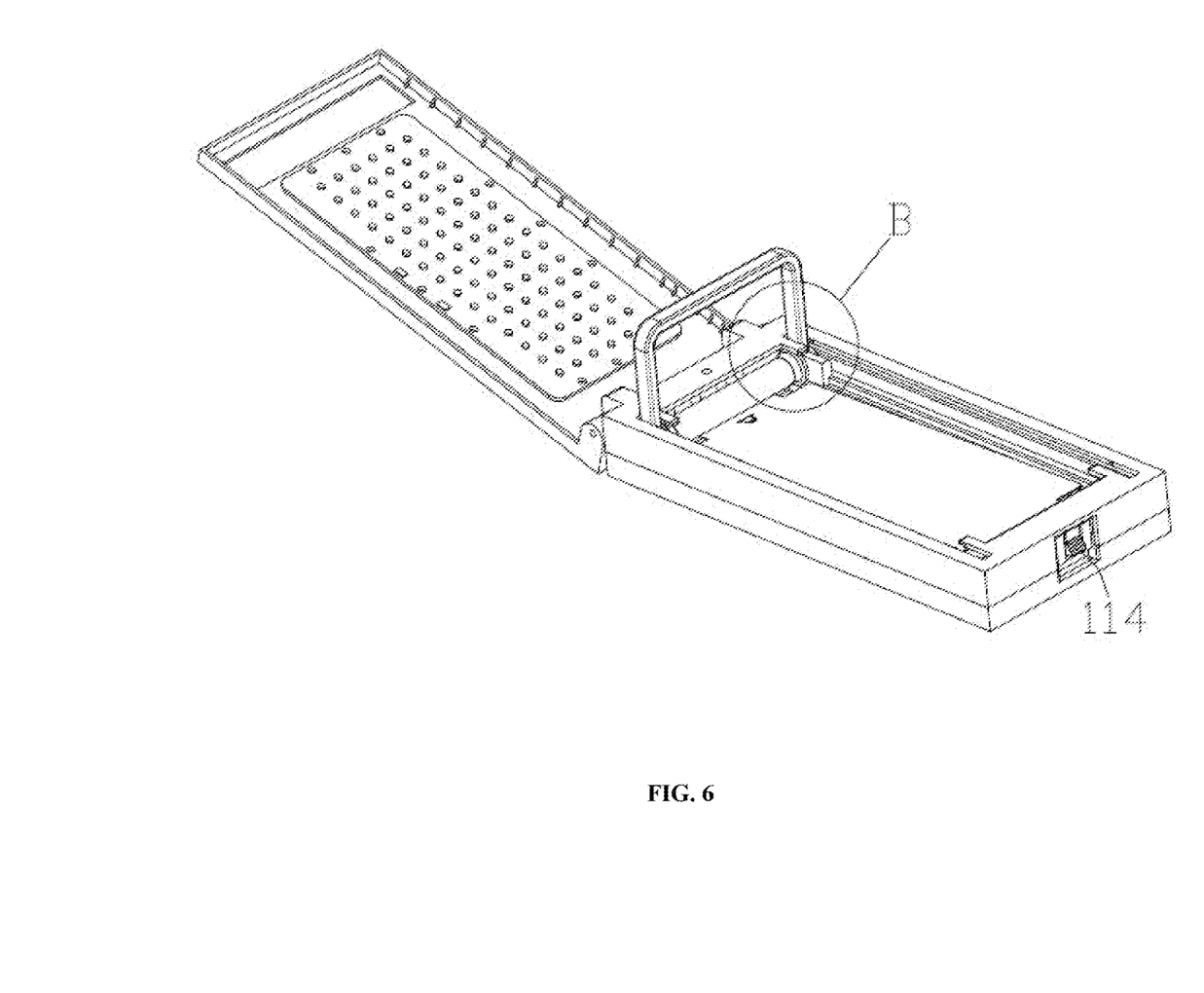
FIG. 6 is a schematic diagram showing a film fixing base and a device fixing base of the apparatus fastened by a buckle according to the embodiment 2 of the present disclosure.

Referring to FIG. 5 to FIG. 6, the sealing cover 400 is connected to and rotatable relative to the device fixing base 110, and the film fixing base 120 is fixed with the device fixing base 110 through a buckle 114. A second sliding groove 123 is defined in the film fixing base 120. The roll assembly 300 further includes a second sliding block 320 capable of sliding in the second sliding groove 123, so that the user can drive the second sliding block 320 to roll by using the second sliding block 320. Similar to the embodiment 1, the roller 800 may also be arranged in the second sliding block 320 to reduce a sliding friction thereof.

Figure 7:
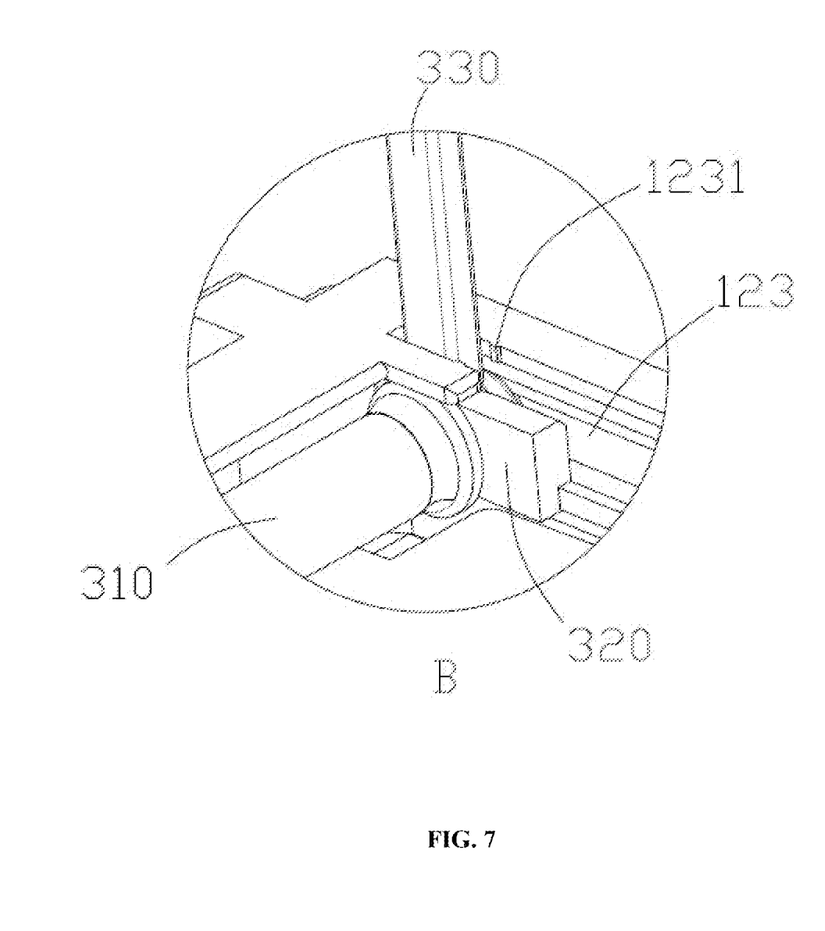
FIG. 7 is a partial enlarged drawing of FIG. 6.

Refer to FIG. 7. A second engaging portion 1231 is further defined in the second sliding groove 123. The second engaging portion extends inwards into the second sliding groove 123, to be in contact with the second sliding block 320 and apply a resistance against sliding of the second slider 320, so that a user can sense a specific position of the second sliding block 320 through sense of touch, to limit the second sliding block 320.

Further, the roll assembly 300 further includes a handle 330. The handle 330 is engaged with the second sliding block 320 and gripped by the user to facilitate pushing the second sliding block 320.

Figure 8:
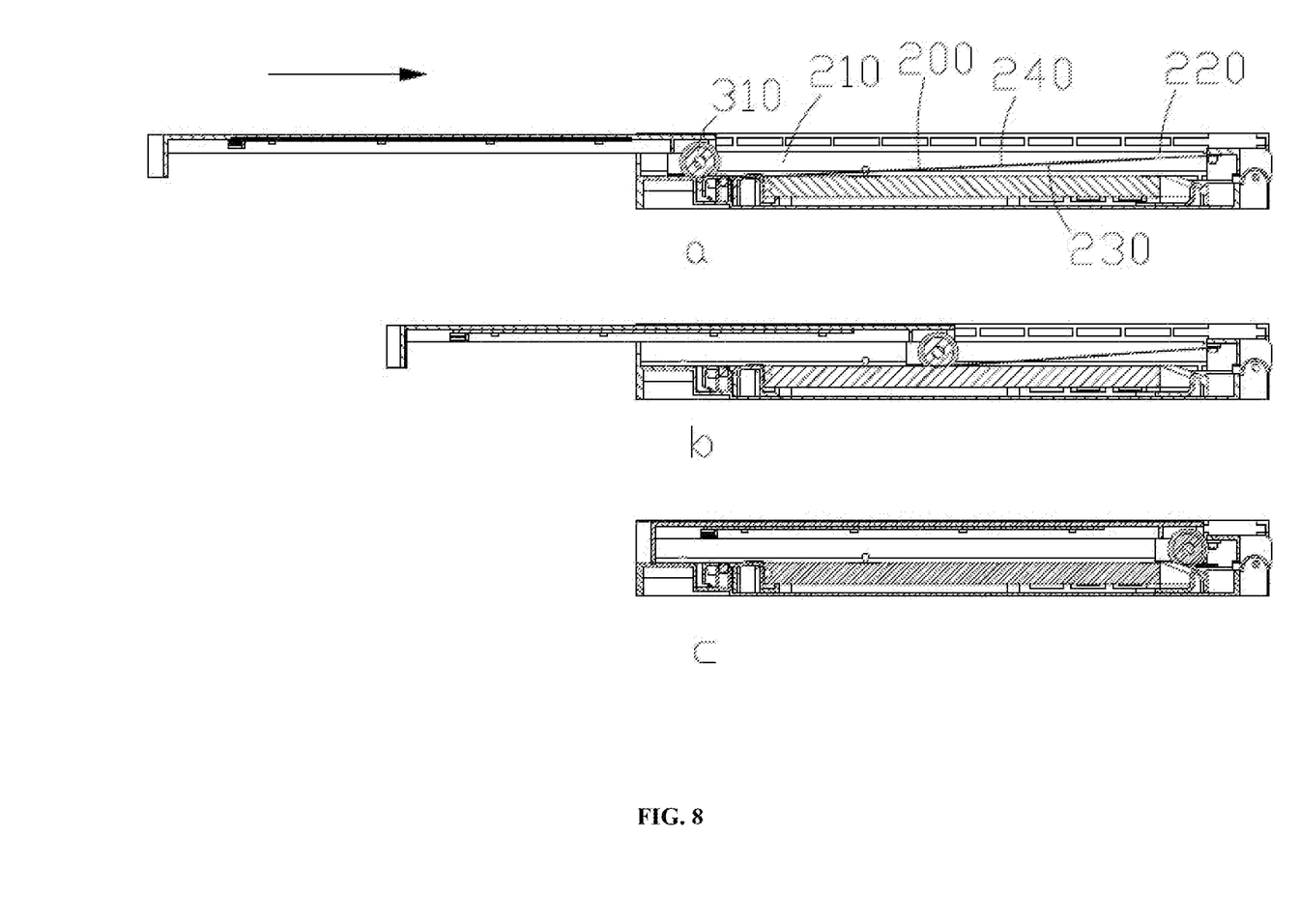

Referring to FIG. 8, the working processes of the apparatus for sticking the film on the display screen is described below as an example.

S100: Fix the electronic device 600 in the device fixing groove 111, fix the film holder 200 in the film fixing base 120, and flip the film fixing base 120 to a position above the device fixing groove 111 to complete preparation.

S200: Referring to FIG. 8a, the press roll 310 is moved from the first end 210 toward the second end 220 of the film holder 200.

S300: Referring to FIG. 8b, during the rolling process, the protective film 700 is pressed to stick to the display screen of the electronic device 600. Therefore, air between the protective film 700 and the display screen may be squeezed out by the press roll 310.

S400: Referring to FIG. 8c, the press roll 310 is moved to the second end 220 of the film holder 200, so that the film holder 200 is separated from the film fixing base 120 and attached to the display screen of the electronic device 600.

S500: Close the sealing cover 400. If the protective film 700 is a UV film and the ultraviolet emission device 500 is arranged in the sealing cover 400, open the ultraviolet emission device 500 to irradiate the protective film 700.

S600: Open the sealing cover 400, flip out the film fixing base 120, draw out the electronic device, and tear the film holder 200, so that the film holder 200 is separated from the protective film 700, so that the protective film 700 is adhered to the surface of the equipment 600, to complete the film sticking work is completed.

The above content merely describes specific embodiments of the present disclosure, however the present disclosure is not limited thereto. A person skilled in the art can make modifications or replacements without departing from the spirit of the present disclosure, and these modifications or replacements shall fall within the protection scope of the claims.

What is claimed is:

1. An apparatus for sticking a film on a display screen of an electronic device, comprising:
   a fixing assembly comprising a device fixing base and a film fixing base, wherein a device fixing groove is defined in the device fixing base for accommodating the electronic device, the film fixing base is connected to the device fixing base and rotatable relative to the device fixing base to a position facing the device fixing groove, and a first fixing column and a second fixing column are defined on two ends of the film fixing base are respectively;
   a film holder, wherein a first end of the film holder is connected with the first fixing column, and a second end of the film holder is connected with the second fixing column so that the film holder is brought to the position facing the device fixing groove when the film fixing base is rotated toward the device fixing base; the first and second end of the film holder are connected to the first and second fixing columns respectively in a way that when the film holder is brought to the position facing the device fixing groove, the first end of the film holder is closer to the display screen of the electronic device than the second end; the film holder has a first surface facing the display screen and a second surface opposite to the first surface and facing the film fixing base; and the first surface is adhered with a protective film capable of being attached to the display screen of the electronic device;
   a roll assembly comprising a press roll, wherein the press roll is configured to roll on the second surface of the film holder to apply a force toward the electronic device on the protective film, and the press roll is configured to roll from the first end to the second end of the film holder; and
   a sealing cover movably connected with the fixing assembly and configured to cover the fixing assembly.

2. The apparatus according to claim 1, wherein a notch is defined on an edge of the device fixing groove that allows a user to draw out the electronic device from the device fixing groove.

3. The apparatus according to claim 1, wherein both the first fixing column and the second fixing column are detachably connected with the film holder.

4. The apparatus according to claim 1, wherein the press roll is a flexible roll.

5. The apparatus according to claim 1, wherein two ends of the press roll each are provided with a chamfer capable of fitting a side edge of the device.

6. The apparatus according to claim 1, wherein the device fixing base further comprises a roll supporter for supporting the press roll when the press roll is not in work.

7. The apparatus according to claim 1, wherein an ultraviolet emission device is arranged in the sealing cover.

8. The apparatus according to claim 1, wherein the device fixing base comprises a first sliding groove, and the sealing cover comprises a first sliding block capable of sliding in the first sliding groove, so that the sealing cover is connected with the device fixing base in a sliding manner; and the press roll is rotationally connected to a bottom of the sealing cover, so that the press roll is driven to roll on the film holder when the sealing cover slides.

9. The apparatus according to claim 8, wherein a first engaging portion is defined in the first sliding groove, and the first engaging portion extends inwards into the first sliding groove, to be in contact with the first sliding block and apply a resistance against sliding of the first sliding block.

10. The apparatus according to claim 1, wherein the sealing cover is connected to the device fixing base and rotatable relative to the device fixing base, the film fixing base comprises a second sliding groove, the roll assembly further comprises a second sliding block capable of sliding in the second sliding groove, and the press roll is rotationally connected with the second sliding block, so that the second sliding block drives the press roll to roll on the film holder.

11. The apparatus according to claim 10, wherein the second sliding groove comprises a second engaging portion, and the second engaging portion extends inwards into the second sliding groove, to be in contact with the second sliding block and apply a resistance against sliding of the second sliding block.

12. The apparatus according to claim 10, wherein the roll assembly further comprises a handle, and the handle is engaged with the second sliding block and configured to be gripped by a user to push the second sliding block.

13. The apparatus according to claim 1, wherein two adjacent edges of the protective film are respectively a first reference edge and a second reference edge, the display screen of the electronic device has a third reference edge corresponding to the first reference edge and a fourth reference edge corresponding to the second reference edge, and after the protective film is attached to the display screen of the electronic device, a distance between the first reference edge and the third reference edge and a distance between the second reference edge and the fourth reference edge each are less than 3 mm.

* * * * *